United States Patent

[11] 3,563,326

| [72] | Inventors | Frank S. Guerriero<br>11 Eastman St., East Concord, N.H. 03301;<br>John Quinn, Jr., 25459 Elon Drive,<br>Dearborn Heights, Mich. 48127 |
|---|---|---|
| [21] | Appl. No. | 783,179 |
| [22] | Filed | Dec. 12, 1968 |
| [45] | Patented | Feb. 16, 1971 |

[54] VEHICLE LOAD INDICATOR SYSTEMS
20 Claims, 7 Drawing Figs.

| [52] | U.S. Cl. | 177/138 |
|---|---|---|
| [51] | Int. Cl. | G01g 19/08 |
| [50] | Field of Search | 177/136–138, 208, 254 |

[56] References Cited

UNITED STATES PATENTS

| 388,874 | 9/1888 | Howard | 177/137 |
|---|---|---|---|
| 1,147,127 | 7/1915 | Troll | 177/137X |
| 1,147,128 | 7/1915 | Troll | 177/137X |
| 1,225,094 | 5/1917 | Wollensak | 177/137 |
| 2,687,293 | 8/1954 | Jackson | 177/137 |
| 2,717,775 | 9/1955 | Jackson | 177/137 |
| 3,167,142 | 1/1965 | Meneely | 177/137 |

FOREIGN PATENTS

| 197,697 | 10/1957 | Australia | 177/136 |
|---|---|---|---|
| 754,783 | 11/1933 | France | 177/137 |
| 983,505 | 6/1951 | France | 177/136 |
| 1,353,831 | 12/1964 | France | 177/137 |
| 1,030,048 | 5/1958 | Germany | 177/137 |
| 1,030,206 | 5/1958 | Germany | 177/137 |

*Primary Examiner*—Richard B. Wilkinson
*Assistant Examiner*—George H. Miller, Jr.
*Attorney*—Barnes, Kisselle, Raisch and Choate

ABSTRACT: A vehicle load indicating system comprising a gauge body which is supported within the vehicle. A tubular member extends from the gauge body and has its lower end fixed adjacent a sprung mass of the vehicle. A rod member is slidably mounted within the tubular member and has its upper end in the gauge body and its lower end fixed to the unsprung mass.

INVENTORS
FRANK S. GUERRIERO
JOHN QUINN JR.
BY

Barnes, Kisselle, Raisch & Choate
ATTORNEYS

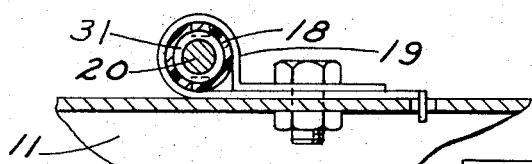
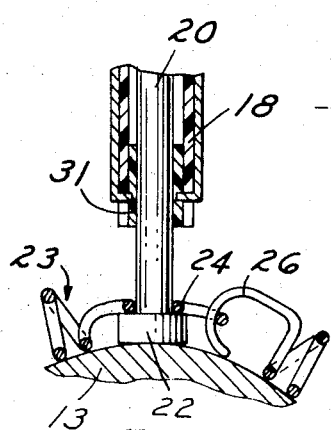
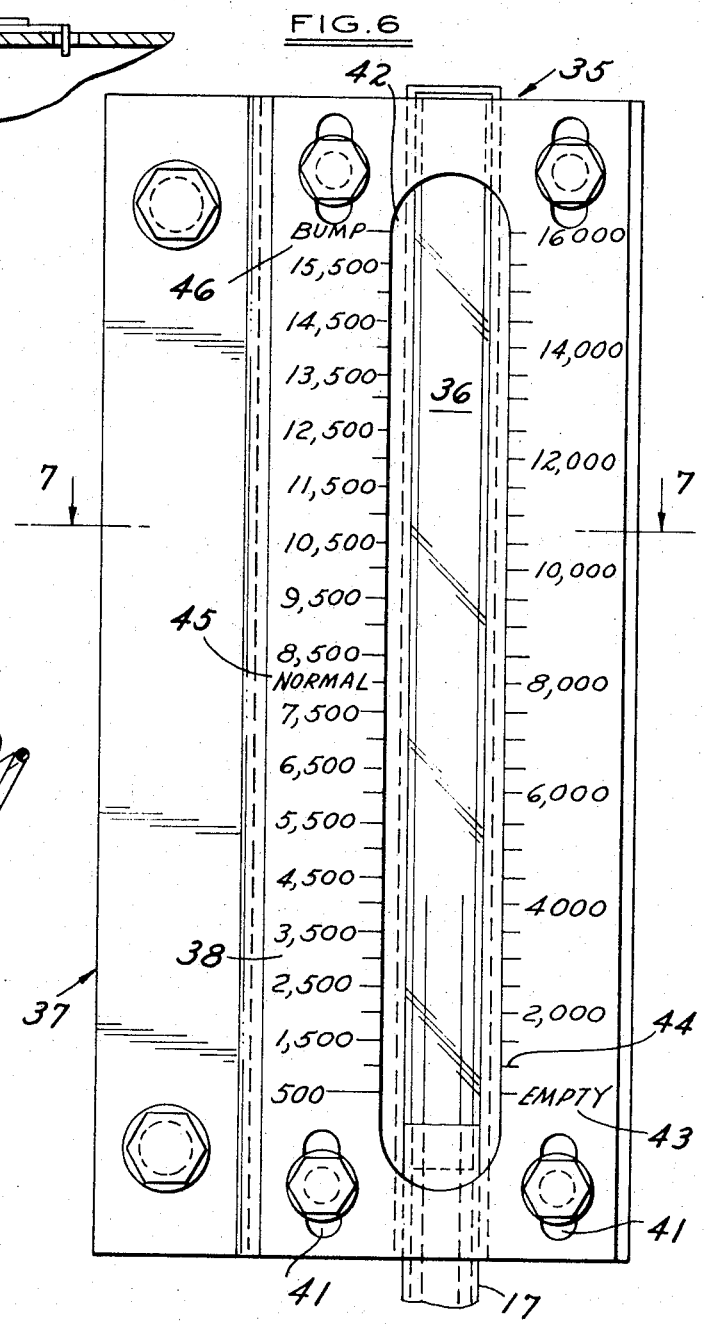
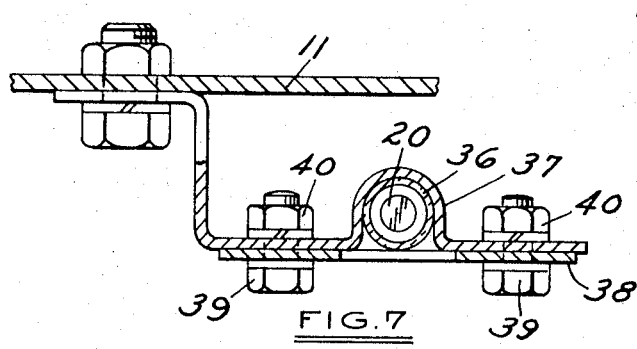

VEHICLE LOAD INDICATOR SYSTEMS

This invention relates to vehicle load indicator systems.

In vehicles and particularly in trucks and trailers, it is desirable to be able to measure the gross vehicle weight, that is, the weight of the unsprung mass plus the weight of the sprung mass which is related to the displacement of the sprung and unsprung masses of the vehicle. Various devices have been heretofore devised for indicating the weight, but none has proved commercially practical either because of expense or maintenance problems.

Among the objects of the present invention are to provide a vehicle load indicator system which will effectively indicate gross vehicle weight and particularly an overload condition; which will indicate the empty, normal, overload or bump load conditions; which can be calibrated in increments of at least 500 pounds; which can be mounted in various planes without affecting the load reading; which has a warning light to warn when the overload condition is approached; which can be universally applied to various types of vehicle; and which is relatively simple and requires a minimum of maintenance.

SUMMARY

A vehicle load indicating system comprising a gauge assembly including a gauge body which is supported within the vehicle. A tubular member extends from the gauge body and has its lower end fixed adjacent a sprung mass of the vehicle. A rod member is slidably mounted within the tubular member and has its upper end in the gauge body and its lower end fixed to the unsprung mass. A gauge assembly is provided for each wheel of the vehicle and the summation of the load values of the gauge assemblies is the gross vehicle weight.

DESCRIPTION OF THE DRAWINGS

FIG. 4 is a fragmentary sectional view on an enlarged scale taken along the line 4—4 in FIG. 1.

FIG. 5 is a fragmentary sectional view of a portion of the system shown in FIG. 2 on an enlarged scale.

FIG. 6 is an elevational view of a modified form of a portion of the system.

FIG. 7 is a fragmentary sectional view taken along the line 7—7 in FIG. 6.

DESCRIPTION

Figure 1:
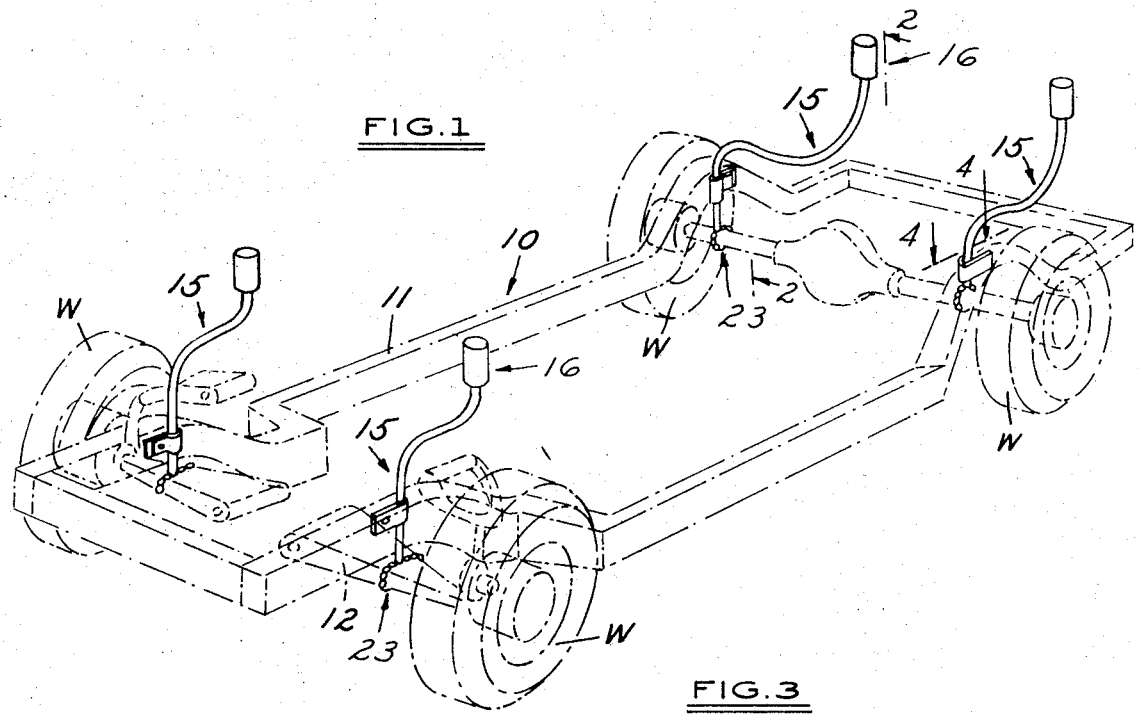
FIG. 1 is a perspective view of a vehicle embodying the vehicle load indicator system.

Referring to FIG. 1, a vehicle 10 is shown comprising a sprung mass 11 including the frame and the items of the vehicle supported by the frame and unsprung masses, namely, the front pivoted wheel supporting arms 12 and the rear axle 13 that support wheels W.

In accordance with the invention, a vehicle load indicating assembly 15 is provided for each wheel.

Figure 3:
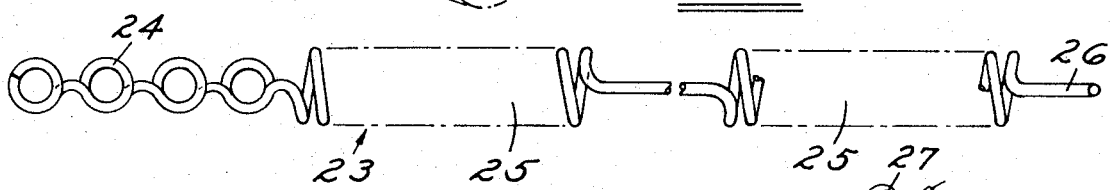
FIG. 3 is a fragmentary plan view on an enlarged scale portion of the system.
Figure 2:
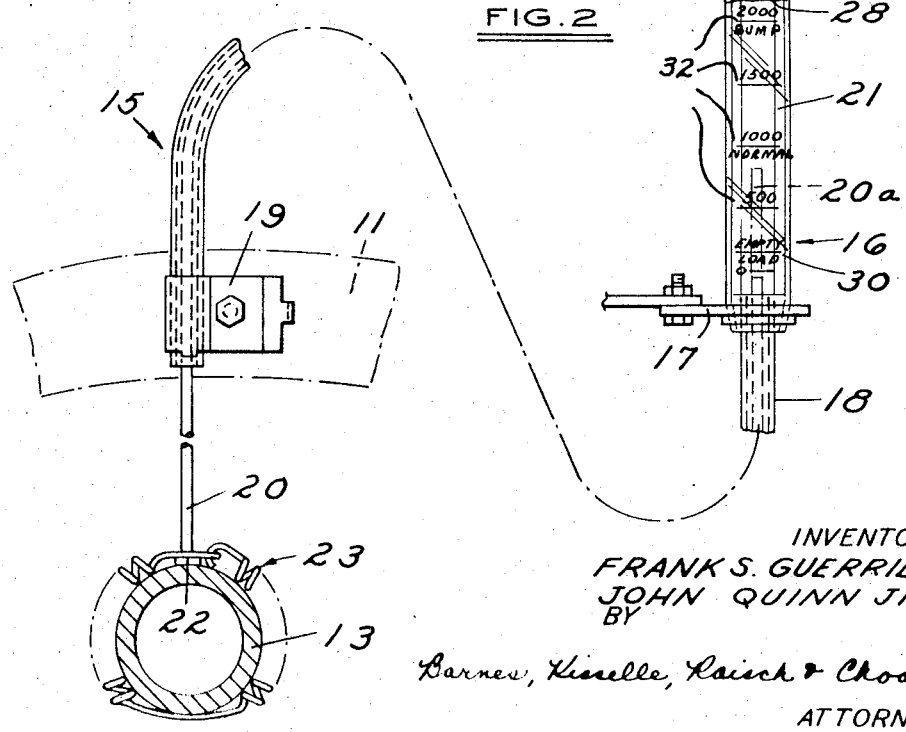
FIG. 2 is a partly diagrammatic view of a portion of the vehicle load indicator system.

As shown in FIG. 2, each assembly 15 comprises a gauge body 16 that is supported by a bracket 17 within the vehicle on the sprung mass in sight of the driver. The assembly further includes a flexible tub 18 that is fixed adjacent its upper end to the gauge body 16 and has its lower end attached to the frame 11, that is, the sprung mass, by a bracket 19. A flexible rod 20 of solid or tubular cross section is slidably positioned within the tube 18 and has its upper end 20a visible through a transparent wall 21 of the gauge body 16 and its lower end formed with an enlargement 22 that is fastened to the unsprung mass shown in FIG. 2 as being the axle 13. The lower end of the flexible rod 20 is fastened to the axle 13 by a spring 23 that comprises a plurality of interconnected loops 24 and spaced helical portions 25 (FIG. 3). A hook 26 on one end of the spring is adapted to engage one of the loops 24 to mount spring 23 on the unsprung mass. The rod member 20 extends through one of the loops 24 and the enlarged end 22 thereof is interposed between that loop and the axle 13 as shown in FIG. 2.

At the top of the gauge body 16, there is provided a warning light 27 which is secured to a plate 82. An electrical wire 29 extends to the upper end of the rod member 20, while another wire extends to the light bulb 27. When the vehicle approaches a bump or overload condition, wire 29 on the end 20a with the wire thereon engages the wire on light bulb 27 to complete a circuit energizing light bulb 27 and thereby providing a warning to the driver.

The gauge body 16 is provided with indicia 30 including indicia corresponding to an empty load 34 and other markings 32 corresponding to the graduations of load, for example, on the order of 500 pounds. The empty load condition corresponds to that when there is no weight on the vehicle that is the curb weight.

A summation of all the loads indicated on each of the gauge assemblies is equal to the gross vehicle weight.

Referring more specifically to FIG. 5, the rod member 20 is slidingly received in the lower end of the tubular member 18 and a bearing sleeve 31 is provided to guide rod member 20 and to act as a seal to prevent the entry of dirt and the like within the tube 18.

Referring to FIG. 6, a modified form of gauge body 35 is shown and comprises a transparent tube 36 that is interposed between a bracket 37 and a plate 38, the assembly being held together by bolts 39 and nuts 40. The plate 38 has elongated openings 41 permitting its displacement vertically with respect to the bracket 37 for calibration purposes. The plate 38 further includes vertically elongated opening 42 to make tubular element 36 visible. As more clearly shown, the plate 38 includes indicia corresponding to the empty condition 43, and other indicia at 500 pound intervals 44. In addition, indicia or markings corresponding to the normal load condition 45 and bump or overload condition 46 are provided.

It can thus be seen that there has been provided a vehicle indicator system that is not dependent upon the type of suspension utilized but in all instances, measures the relative displacement of the sprung and unsprung mass.

In each of the forms of the invention, the tube 18, rod 20, and bearing sleeve 31 are made of organic plastic material. Satisfactory results have been achieved where the tube 18 is made of polycarbonate plastic, the bearing sleeve 31 is made of polyurethane open cell foam plastic, and the rod 20 is made of nylon such as nylon type 66, ASTM Standard D789 or high molecular weight polyethylene such as sold under the trademark ULTREX by Spiratex Company, Dearborn, Mich.

We claim:

1. In a vehicle having an unsprung mass and a sprung mass including wheels and means for rotatably supporting each wheel, the combination comprising:
    a gauge assembly individual to each wheel;
    said gauge assembly comprising a flexible tubular member;
    a gauge body;
    means for connecting said gauge body to one end of said flexible tubular member;
    means for supporting said gauge body on said sprung mass within sight of a person in the vehicle;
    means for attaching said tubular member adjacent its other end to said sprung mass;
    a flexible rod member slidably mounted within said tubular member;
    said flexible rod member having one end thereof projecting into said gauge body and the other end thereof extending out of the other end of said tubular body;
    means for attaching the other end of said rod member to its respective wheel supporting means of said unsprung mass;
    said gauge body having indicia means thereon corresponding to the various loading conditions of the sprung mass with respect to the unsprung mass.

2. The combination set forth in claim 1 wherein said rod member is solid in cross section.

3. The combination set froth in claim 1 wherein said rod member is tubular in cross section, the lower end of said rod member being closed.

4. The combination set forth in claim 1 wherein said indicia on said gauge body include indicia corresponding to an empty load, a normal load, and an overload condition.

5. The combination set forth in claim 1 including electrical means actuated by movement of the rod member within said gauge body to an overload condition to provide a signal.

6. The combination set forth in claim 1 wherein said means for attaching the lower end of said rod member to its respective wheel supporting means of said unsprung mass comprises means encircling a portion of said wheel supporting means.

7. The combination set forth in claim 6 wherein said last-mentioned means comprises a spring having its end interconnect, the end of said rod member being fixed to said spring.

8. The combination set forth in claim 7 wherein the end of said rod member is enlarged, said spring having a loop portion beneath which said enlarged end extends and is thereby interposed between wheel supporting means and the spring member.

9. The combination set forth in claim 1 including seal means interposed between the other end of said tubular member and said rod member.

10. The combination set forth in claim 1 wherein said gauge body has a transparent tube therein into which the upper end of said rod member extends.

11. In a vehicle having an unsprung mass and a sprung mass, the combination comprising:
 a gauge assembly;
 said gauge assembly comprising a flexible tubular member;
 a gauge body;
 means for connecting said gauge body to one end of said flexible tubular member;
 means adapted to support said gauge body on said sprung mass within sight of a person in the vehicle;
 means adapted to attach said tubular member adjacent its other end to said unsprung mass;
 a flexible rod member slidably mounted within said tubular member;
 said flexible rod member having one end thereof projecting into said gauge body and the other end thereof extending out of the other end of said tubular body;
 means adapted to attach the other end of said rod member to said unsprung mass;
 said gauge body having indicia means thereon corresponding to the various loading conditions of the sprung mass with respect to the unsprung mass;
 the end of the flexible rod acting as the pointer for the gauge.

12. The combination set forth in claim 11 wherein said rod member is solid in cross section.

13. The combination set forth in claim 11 wherein said rod member is tubular in cross section, the lower end of said rod member being closed.

14. The combination set forth in claim 11 wherein said indicia on said gauge body include indicia corresponding to an empty load, a normal load, an an overload condition.

15. The combination set froth in claim 11 including electrical means actuated by movement of the rod member within said gauge body to an overload condition to provide a signal.

16. The combination set forth in claim 11 wherein said means for attaching the lower end of said rod member to said unsprung mass comprises means adapted to encircle a portion of said unsprung mass.

17 The combination set forth in claim 16 wherein said last-mentioned means comprises a spring having its ends interconnected, the end of said rod member being fixed to said spring.

18. The combination set forth in claim 17 wherein the end of said rod member is enlarged, said spring having a loop portion beneath which said enlarged end extends and is thereby adapted to be interposed between a portion of the unsprung mass and the sprung member.

19. The combination set forth in claim 11 including seal means interposed between the other end of said tubular member and said rod member.

20. The combination set forth in claim 11 wherein said gauge body has a transparent tube therein into which the upper end of said rod member extends and the end of the rod acts as a pointer for the gauge.